July 13, 1943.  L. A. CAMEROTA  2,324,360
THROTTLE VALVE
Filed March 17, 1942  2 Sheets-Sheet 1
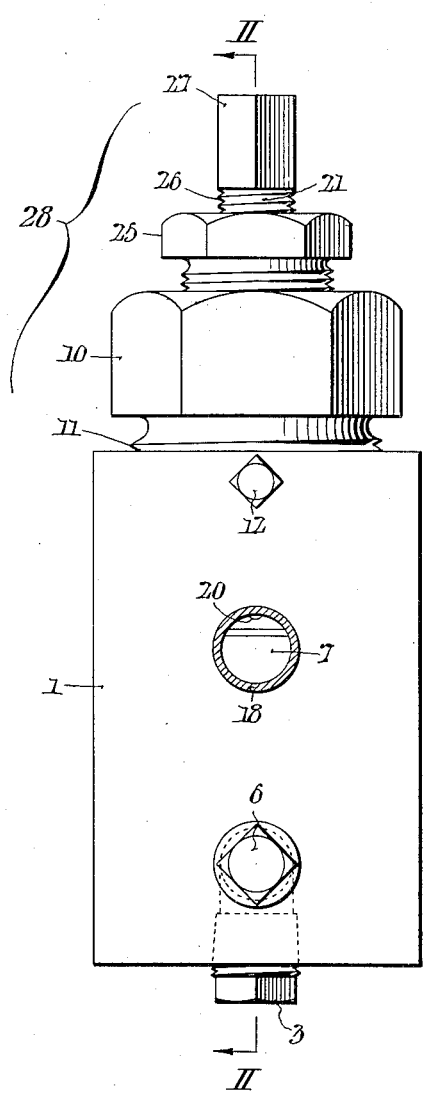
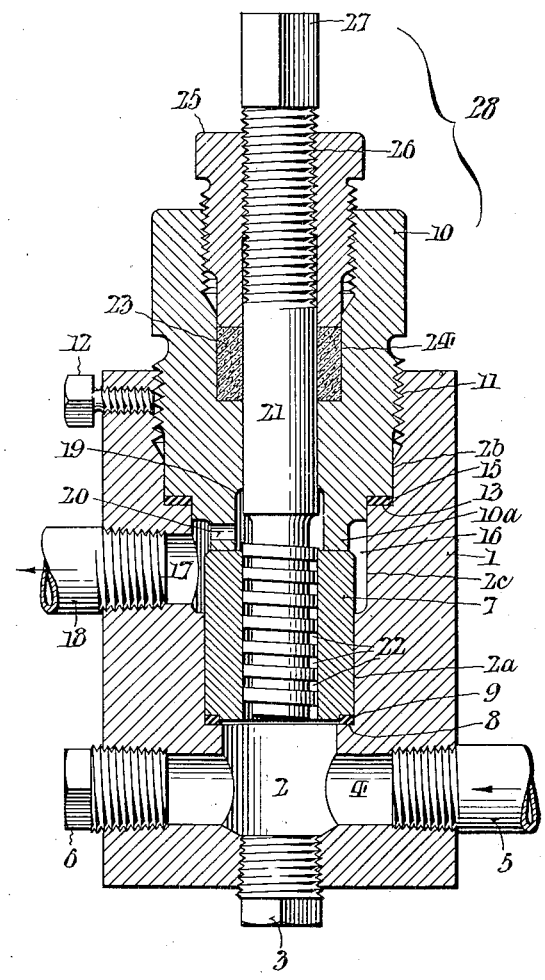
WITNESSES:
Thomas W. Kerr, Jr.
Hubert Fuchs
INVENTOR:
Louis A. Camerota,
BY Paul Paul
ATTORNEYS.

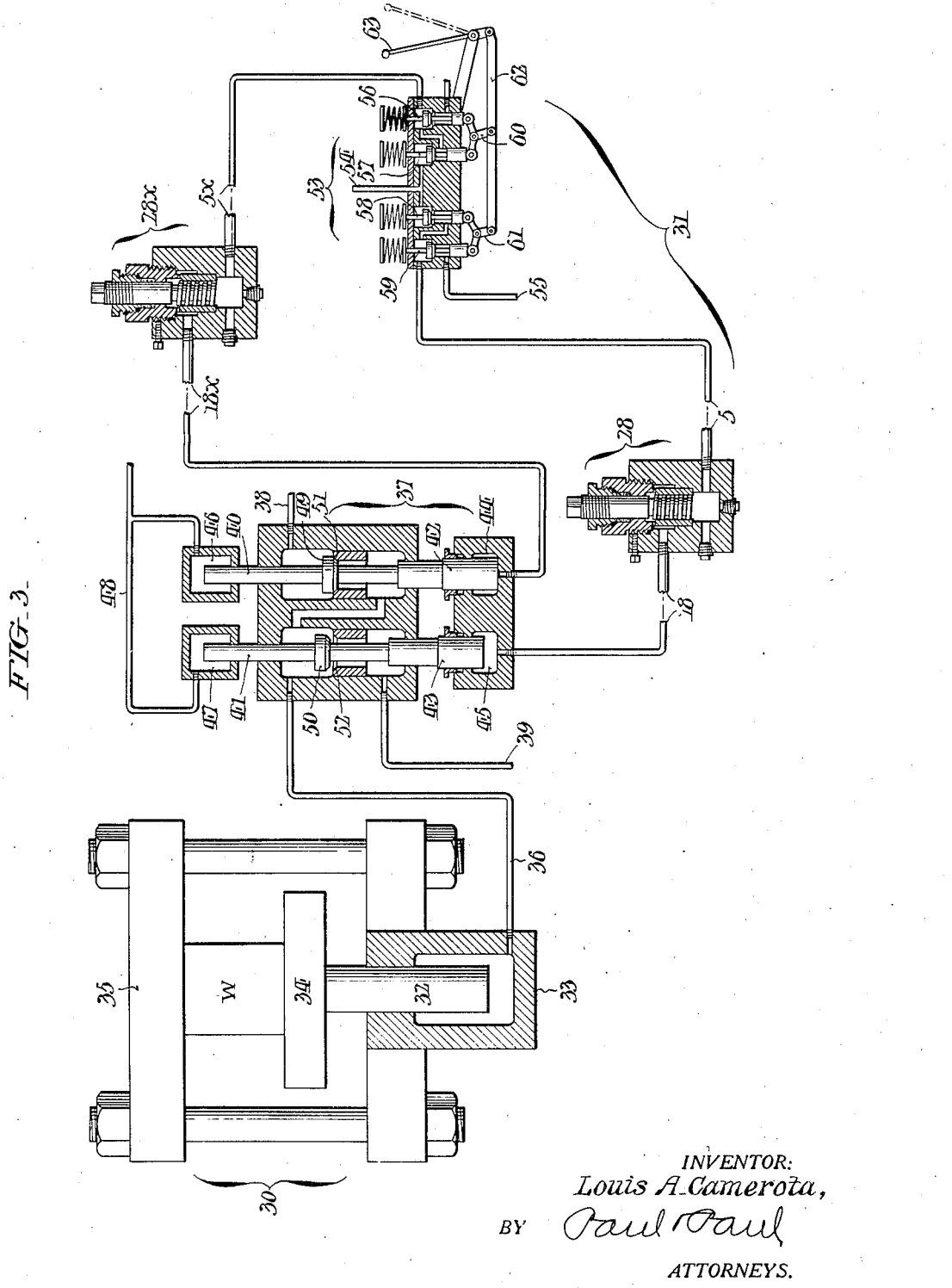

Patented July 13, 1943

2,324,360

UNITED STATES PATENT OFFICE 2,324,360

THROTTLE VALVE

Louis A. Camerota, Burlington, N. J., assignor to Florence Pipe Foundry & Machine Company, Florence, N. J., a corporation of New Jersey Application March 17, 1942, Serial No. 435,050

4 Claims. (Cl. 138—43)

This invention relates to throttle valves, that is to say to valves for choking or retarding the flow of pressure fluids in pipes or conduits, and of a type useful in connection with control systems for high pressure hydraulic presses and the like where it is desirable to prevent spasmodic or jumpy press operation, and so preclude destructive shocks not only to the presses themselves but the pipe-lines of the control systems as well.

My invention has for its chief aim the provision of a valve of the kind referred to which is simple in construction; which lends itself readily to economic manufacture; which is devoid of moving parts; which is immune against becoming easily clogged; and which is traversable by pressure fluid flowing in either direction.

The foregoing and other advantages I attain as hereinafter more fully disclosed, in a throttle valve characterized by having within its body, between inlet and outlet ports, a relatively long and devious passage of spiral form incident to the traverse of which the velocity of the pressure fluid is effectively reduced.

In a throttle valve having the recited attributes, it is a further aim of my invention to make it possible to adjust the length of the devious passage so that the throttling influence of the valve may be varied, and moreover to provide for the ready interchange of parts when increased or decreased capacity is desired without necessitating the removal of the valve from the pipe-line in which it is interposed.

Other objects and attendant advantages will appear from the following detailed description of the attached drawings, wherein Fig. 1 is a side elevation of a throttle valve conveniently embodying my invention.

Fig. 2 is an axial sectional view of the valve taken as indicated by the angled arrows II—II in Fig. 1; and Fig. 3 is a diagrammatic view showing a hydraulic press with a controlled system therefor incorporating throttle valves of my invention.

With more detailed reference first more particularly to Figs. 1 and 2 of these illustrations, my improved throttle valve comprises a body 1 which may be of cylindric configuration, and which has an axial bore 2 closed at the bottom end by a screw plug 3. Leading into the lower end portion of the bore 2 from one side of the body is a port 4 for pressure fluid, said port being internally threaded for connection of a pipe 5. As shown, the port 4 is extended through the opposite side of the body 1 and there closed by a screw plug 6. Upon removal of the plugs 3 and 6, ready access may be had to the bore 2 and port 4 for convenience of cleaning them. Immediately above the port 4, the bore 2 of the body is diametrically enlarged, as at 2a for the snug reception of a bushing 7 between the bottom end of which and the shoulder 8, a sealing gasket 9 of rubber or the like is interposed. The bushing 7 is held in place through engagement of its top end by the diametrically reduced lower end portion 10a of a sleeve 10 which has a screw connection at 11 with the upper enlarged portion 2b of the axial bore, and which is held against accidental turning by a set screw 12. Intermediate the portions 2a and 2b of the bore 2 is a portion 2c whereof the diameter is slightly greater than that of the bushing 7 and slightly less than that of the sleeve 10, with resultant formation of an annular shoulder 13 at which the joint is sealed by a gasket 15. As further seen from Fig. 2, an annular flow channel 16 is formed around the top of the bushing 7 and the contiguous reduced abutting lower end 10a of the sleeve 10 at the portion 2c of the bore 2; and leading laterally from this channel is a port 17 which is internally threaded for connection of a pipe 18. The lower end of the sleeve 10 has a counter-bore at 19 in communication with the annular channel 16 by way of a lateral port 20 in the reduced bottom portion 10a of said sleeve.

Extending axially down through the sleeve 10 and the bushing 7 with a snug fit is a cylindric core element or stem 21 whereof the portion engaged within said sleeve has a helical thread which defines a devious passage 22 of considerable length in the interval between the ports 4 and 17 of the valve. As a consequence of being obliged to traverse the devious passage 22, it will be apparent that the velocity of the pressure fluid in the valve will be effectively reduced. Leakage around the stem 21 is prevented by packing 23 compressed into the upper enlarged portion 24 of the sleeve bore by a screw gland 25. As shown, the core element or stem 21 has threaded engagement at 26 within the bore of the gland 25, and its protruding end is fashioned to polygonal configuration as at 27 for application of a wrench thereto. Rotation of the core element 21 in one direction or the other will thus be attended by axial movement thereof with increase or decrease in the effective length of the passage 22 to correspondingly vary the throttling influence of the valve. Due to the construction of the valve, as described, it is possible to interchange certain of its parts when decrease or increase of its capacity is desired, without necessitating removal of the body of the valve from the pipe-line in which it is positioned. Thus, for example, if greater retardation in the flow is desired over that possible within the range of adjustment of the valve, a core element or stem with smaller pitch bottom thread may be substituted for the one shown in Fig. 2. As another alternative, another bushing of a larger internal diameter, and a core element together with a different sleeve and gland, may be substituted likewise without requiring the removal of the valve body from the pipe-line. For convenience of reference to the valve as a whole in further description I have designated the same comprehensively by the numeral 28.

In Fig. 3 which exemplifies one use of my improved throttle valve there is shown a hydraulic press 30 whereof the control system is comprehensively designated 31. As diagrammatically illustrated, the ram 32 of the press cylinder 33 carries a platen 34, between which and the press head 35, the work W is compressed in the usual well known manner. Supply and exhaust of pressure fluid medium to and from the press cylinder 33 through a pipe 36 is governed by an operating valve 37 which is in communication with a source (not shown) of the pressure fluid by way of a pipe 38, and which is exhausted in turn through a pipe 39. The supply and exhaust control plungers 40 and 41 of the operating valve 37 are independently actuated from beneath by rams 42 and 43 whereof the cylinders are designated 44 and 45. The upper ends of the plungers 40 and 41 extend into cylinders 46 and 47 which are in communication with the pressure fluid supply source through piping 48, with the result that the valve heads 49 and 50 on said plungers are normally held in closed positions on their seats 51 and 52. By means of the pipes 5, 18 and 5x, 18x in which throttle valves 28 and 28x of my invention are respectively interposed, the cylinders 44 and 45 of the operating valve 37 are connected to a pilot valve 53 by which said operating valve is controlled, the pilot valve being supplied with pressure fluid through a pipe 54 and exhausted through a pipe 55. As shown, the pilot valve 53 has supply and exhaust control plungers 56, 57 and 58, 59 for governing flow and discharge through said pipes 5, 18 and 5x, 18x to and from the respective cylinders 44 and 45 of the operating valve 37. The plungers 58 and 59 of the pilot valve 53 are operable in alternation with the plungers 56 and 57 from beneath by double arm rockers 60 and 61 which are coupled by a link 62 with a control lever 63. With the parts in the illustrated positions, the plunger 41 of the press operating valve 37 is raised to allow the pressure fluid in the cylinder 33 of the press 30 to exhaust by way of the pipes 36 and 39 for lowering of the press platen 34. Shifting of the pilot valve actuating lever 63 to the position indicated in dot-and-dash lines will obviously result in the reversal of the positions of the plungers 56—59 of said valve with attendant elevation of the plunger 40 of the press operating valve 37 to allow flow of the pressure medium to the cylinder 33 of the press 30 for raising of the platen 34. It will therefore be seen that in the two phases of press operation, the respective throttle valves 28, 28x operate to choke or retard the flow of the pressure fluid through the pipes 5, 18 and 5x, 18x to the press operating valve 37 and thereby prevent jumpy operation of the press and sudden destructive shocks to the various pipe-lines embodied in the control system 31.

Having thus described my invention, I claim:

1. A throttle valve comprising a body with an axial bore which is closed at one end, said bore being enlarged at the opposite end and having a medial portion of intermediate diameter; a bushing set into the smaller portion of the bore; a retaining sleeve engaged in the large end of the bore and having a diametrically reduced end which bears on one end of the bushing to hold the latter in place, the reduced end of said sleeve and the contiguous end of the bushing being exposed in the medial portion of the bore in the valve body with provision of an annular passage thereabout; a port for a pipe connection communicating with the bore of the body from one side beyond the opposite end of the bushing; a port for another pipe connection extending laterally of the medial portion of the body bore and communicating with the annular passage aforesaid; a port in turn leading from said annular passage through the reduced end of the sleeve to a counter-bore within said sleeve; and a core piece or stem extending down through the sleeve and the bushing with a snug fit, said core element or stem having a helical thread on that portion thereof which is within the bushing to define a devious throttling passage in the interval between said flow ports.

2. A throttle valve according to claim 1, in which the bore in the sleeve is enlarged at its outer end to receive packing to prevent leakage around the core element or stem; in which a gland threadedly engaged in the enlarged outer end of the bore in the sleeve compresses the packing; and in which the portion of the core element or stem has threaded engagement with the bore of the gland, so that upon rotation and attendant axial shifting of said core element or stem, the devious passage can be lengthened or shortened to correspondingly vary the throttling effect of the valve.

3. A throttle valve having a body with an axial bore extending part way therethrough, and an inlet and an outlet communicating laterally with the bore in spaced transverse planes; a stem having a helix at its inner end to form with the bore in the interval between said inlet and outlet, a spiral throttling passage; and a stuffing box element in which the stem is threadedly engaged for axial adjustment to vary the throttling effect of the valve, said stuffing box closing the open end of the bore and being detachably secured for convenience of removal as a unit with the stem to enable cleaning of the valve without attendant disturbance of the stem adjustment.

4. A throttle valve having a body with an axial bore extending part way therethrough, and an inlet and an outlet communicating laterally with the bore in spaced transverse planes; a bushing sleeve fitting the bore in the interval between said inlet and outlet, and resting against an annular shoulder within the valve body; a stem having a helix at its inner end within the bushing sleeve to form with the latter, a spiral throttling passage; and a stuffing box element with a packing gland in which the stem is threadedly engaged for axial adjustment to vary the throttling effect of the valve, said stuffing box serving to hold the aforesaid bushing sleeve in place, and being detachably secured to the valve body for convenience of removal as a unit with the gland and the stem to enable cleaning of the valve without attendant disturbance of the stem adjustment.

LOUIS A. CAMEROTA.